United States Patent [19]

Takegawa et al.

[11] Patent Number: 5,550,000
[45] Date of Patent: Aug. 27, 1996

[54] PROCESS FOR PRODUCING ELECTROPHOTOGRAPHIC PHOTORECEPTOR

[75] Inventors: Ichiro Takegawa; Shigeto Hashiba; Hiroshi Miyamoto; Nobuyuki Ichizawa, all of Minami-ashigara, Japan

[73] Assignee: Fuji Xerox Co., Ltd., Tokyo, Japan

[21] Appl. No.: 417,886

[22] Filed: Apr. 6, 1995

[30] Foreign Application Priority Data

Jun. 30, 1994 [JP] Japan .................. 6-170364

[51] Int. Cl.⁶ .............. G03G 5/06; G03G 5/14; G03G 5/047
[52] U.S. Cl. ............. 430/131; 430/130; 430/132; 430/133
[58] Field of Search ................. 430/130, 131, 430/132, 133

[56] References Cited

U.S. PATENT DOCUMENTS 5,449,573  9/1995  Aoki et al. .............. 430/131

FOREIGN PATENT DOCUMENTS

| | | |
|---|---|---|
| 59-22438 | 2/1984 | Japan . |
| 61-94057 | 5/1986 | Japan . |
| 2-59767 | 2/1990 | Japan . |
| 3-18858 | 1/1991 | Japan . |
| 4-124674 | 4/1992 | Japan . |
| 4-145416 | 5/1992 | Japan . |
| 4-162047 | 6/1992 | Japan . |

*Primary Examiner*—Roland Martin
*Attorney, Agent, or Firm*—Oliff & Berridge

[57] ABSTRACT

A process for the preparation of an electrophotographic photoreceptor having a high sensitivity and stability and an excellent product quality stability without being affected by the production environment is disclosed, which comprises coating on a substrate a functional layer-forming coating solution containing a compound which undergoes polycondensation upon hydrolysis, adjusting a temperature of said substrate having the coated layer such that relationship (1) is satisfied, and then moistening said coated layer at a temperature of 30° C. to 180° C. in an atmosphere of a dew point of 25° C. to 80° C.:

$$DP \leq ST \leq DP+40° C. \quad (1)$$

wherein DP represents the dew point upon said moistening and ST represents the temperature of the substrate just before said moistening.

7 Claims, No Drawings

PROCESS FOR PRODUCING ELECTROPHOTOGRAPHIC PHOTORECEPTOR

FIELD OF THE INVENTION

The present invention relates to a process for producing an electrophotographic photoreceptor having a high sensitivity and stability and an excellent product quality stability. More particularly, the present invention-relates to a process for producing an electrophotographic photoreceptor, which comprises moistening a coating layer at a high temperature during the coating step.

BACKGROUND OF THE INVENTION

An electrophotographic apparatus can operate at a high speed to give a high printing quality. Thus, it has been used in the field of copying machine, laser beam printer, etc. As the photoreceptor for use in the electrophotographic apparatus, an organic photoreceptor (OPC) comprising an organic photoconductor has been developed and spreaded. The structure of the photoreceptor has changed from a single layer structure having a charge-transfer type complex and a charge generation material dispersed in a binder resin to a laminated structure in which a charge-generating layer and a charge-transporting layer are functionally separated from each other to attain improvements in properties. In its current typical embodiment, this functionally separated type photoreceptor is prepared by forming an undercoating layer on an aluminum substrate, and then forming a charge-generating layer and a charge-transporting layer thereon.

With the progress of technology concerning electrophotographic apparatus, photoreceptors which achieved a high image quality have been required. Since any functional layers such as charge-generating layer, charge-transporting layer and undercoating layer have important effects on electrophotographic properties such as sensitivity, image quality, and stability upon repeated use (repetition stability), attempts have been made to improve these functional layers for the purpose of improving the repetition stability and environmental stability of the photoreceptor.

From this standpoint of view, the inventors made studies of functional layers having a higher sensitivity, image quality and repetition stability. As a result, it was found that a film obtained by drying and curing a compound which undergoes polycondensation upon hydrolysis such as silane coupling agent provides excellent electrophotographic properties as an undercoating layer. Such a knowledge has been put into practical use. The formation of an undercoating layer or interlayer from a compound which undergoes polycondensation upon hydrolysis is disclosed in JP-A-59-22438, JP-A-61-94057, JP-A-2-59767, JP-A-3-18858, JP-A-4-124674, JP-A-4-145416, and JP-A-4-162047. (The term "JP-A" as used herein means an "unexamined published Japanese patent application".)

These compounds require a proper amount of water to undergo curing reaction. Upon hydrolysis reaction, these compounds undergo dealcoholation of alkoxide groups such as methoxy, ethoxy and butoxy or elimination of chelate groups such as acetyl acetonate, followed by condensation reaction. Therefore, the presence of water content is essential in order to efficiently accelerate the curing reaction of the layer containing those compounds. The water content is normally supplied from water content present in the coating solution, or air during drying to the touch, or air contained in the dryer during drying. Thus, the curing reaction proceeds.

However, the amount of water content present during coating or drying to the touch or in the dryer is not large enough to accelerate the curing reaction. Further, since the amount of water content varies with weather conditions such as seasonal changes of climate, the coat thus obtained can be left insufficiently cured, resulting in fluctuation of layer properties. Therefore, photoreceptor products prepared from these materials show a markedly varied product quality. In particular, films cured in dry winter season tend to show insufficient hydrolytic condensation, and they suffer from defects in electrophotographic properties such as increase of residual potential and imaging failure. On the other hand, if the water content is too much in the coating solution, the hydrolysis reaction undergoes during storage of the coating solution, causing an extremely large change in properties with the lapse of time. Thus, the pot life of the coating solution is drastically reduced.

SUMMARY OF THE INVENTION

It is therefore an object of the present invention to provide a process for producing an electrophotographic photoreceptor having a high sensitivity and stability and an excellent product quality stability without being affected by the environmental condition during the production thereof.

The foregoing object of the present invention will become more apparent from the following detailed description and examples.

The inventors made extensive studies to attain the foregoing object. As a result, it has been found that the water content can be efficiently supplied into a coated layer containing a hydrolytically condensable compound by moistening with wet hot air. It has also been found that the curing reaction can be thus drastically accelerated to provide excellent electrophotographic properties. It has further been found that the temperature of a substrate carrying the coated layer and being subjected to moistening is important to proceed the hydrolytic condensation of the compound properly. The present invention has been attained based on these findings.

The present invention concerns a process for producing an electrophotographic photoreceptor, which comprises coating on a substrate a functional layer-forming coating solution containing a compound which undergoes polycondensation upon hydrolysis, adjusting a temperature of said substrate having the coated layer such that relationship (1) is satisfied, and then moistening said coated layer at a temperature of 30° C. to 180° C. in an atmosphere of a dew point of 25° C. to 80° C.:

$$DP \leq ST \leq DP + 40° C. \tag{1}$$

wherein DP represents the dew point upon said moistening and ST represents the temperature of the substrate just before said moistening.

DETAILED DESCRIPTION OF THE INVENTION

The term "functional layer" as used herein is meant to include a photosensitive layer such as a charge-generating layer and other layers constituting an electrophotographic photoreceptor such as an undercoating layer, an interlayer and a surface protective layer.

The process of the present invention can be applied when a functional layer-forming coating solution containing a compound which undergoes polycondensation upon hydrolysis is used to prepare an electrophotographic photoreceptor. For example, if a compound which undergoes polycondensation upon hydrolysis, such as silane coupling agent, is contained in an undercoating layer-forming coating solution, the process of the present invention can be employed. The present invention will be further described with reference mainly to the use of an undercoating layer-forming coating solution, but not limited thereto.

In the process of the present invention, an undercoating layer-forming coating solution containing a compound which undergoes polycondensation upon hydrolysis is coated on a substrate, and air-dried to touch. Then, the coated layer is moistened at a temperature of 30° C. to 180° C. in an atmosphere of dew point of 25° C. to 80° C. The moistening can be carried out by exposing the coated layer to the wet hot atmosphere, generally by way of blowing a wet hot air over the coated layer. The moistening time may be arbitrary so far as it is long enough to allow the coated layer to absorb water content sufficiently. From the standpoint of effectiveness and processing time, moistening may be normally effected over 3 minutes to 2 hours. In the present invention, high temperature moistening is effected at a temperature of 30° C. to 180° C. in an atmosphere of dew point of 25° C. to 80° C. to allow the coated layer to contain an increased water content as well as accelerate the curing reaction.

In the present invention, if the foregoing high temperature moistening is effected, the substrate temperature need be controlled, just before the moistening, to a range of from not lower than the dew point upon the moistening to the temperature 40° C. higher than the dew point upon the moistening. If the substrate temperature is lower than the dew point of the moistening atmosphere, the surface of the coated layer is wet with dew, causing nonuniformity in the hydrolysis of the compound contained in the coated layer. Further, the water droplets produces depressions and hence an unevenness on the surface of the coated layer. The water droplets may also crack the coated layer. On the other hand, if the substrate is heated to too high temperature, i.e., more than 40° C. higher than the dew point, prior to the moistening, the hydrolysis reaction is suppressed, making it impossible to make sufficient hydrolysis of the compound contained in the coated layer. Thus, a sufficient moistening effect cannot be exerted. Preferably, the substrate on which a coated layer has been formed is heated prior to the moistening, to a temperature above the dew point upon moistening but close to the dew point, more specifically within 15° C. higher than the dew point, whereby extremely excellent electrophotographic properties can be attained.

The coated layer to which the moistening with wet hot air can be applied is not limited to the undercoating layer. Even if a charge-generating layer, charge-transporting layer, interlayer, or surface protective layer is subjected to the moistening treatment, the same effect can be exerted so far as the layer is formed using a coating solution containing a compound which undergoes polycondensation upon hydrolysis. The process of the present invention can be applied to a photoreceptor having a single photosensitive layer comprising a charge generation material and a charge transport material as admixture or a photoreceptor having an analogous structure.

After the moistening, the coated layer is preferably subjected to heating at a temperature of not lower than 80° C. to accelerate the curing reaction. However, since the curing reaction can proceed to some extent at room temperature after moistening with wet hot air, the coated layer such as a photosensitive layer need not be subjected to curing at a high temperature if desired.

Typical examples of the compound which undergoes polycondensation upon hydrolysis are silicone compounds such as silane coupling agents, zirconium coupling agents, and organic metal compounds such as organic metal alkoxides (including metal chelates), with silane coupling agents, zirconium coupling agents and zirconium chelates being preferred.

The organic metal compound which can be used in the present invention is represented by formula (I)

wherein R represents an alkyl group, a cycloalkyl group, an aryl group, an alkaryl group, or an acyl group; M represents a metal atom (e.g., Cu, Ag, Hg, Li, Be, B, Zn, Cd, Al Co, Ni, Cu, Au, Pd, Pt, Ca, St, Ba, Ti, V, Cr, Ha, Fe, Sc, Y, Si, Sn, Pb, Ru, Rh, Os, It, Zr, Hf, Ho, W, U, etc.) or oxides or sulfides thereof; A represents a chelating agent; n is the valency of M; and m is 0 or an integer of up to n−1, provided that the plurality of R may be the same or different when n-m is 2 or more. The chelating agent represented by A is a compound having two or more donor (ligand) groups capable of forming a ring structure through bonds with a metal atom. Examples of the donor include those having an oxygen atom as a coordinating atom

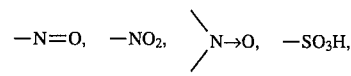

and —PO$_3$H$_2$), those having a nitrogen atom as a coordinating atom

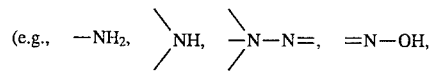

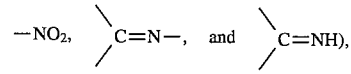

and those having a sulfur atom as a coordinating atom

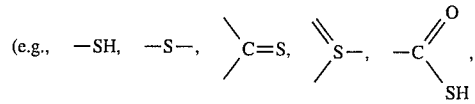

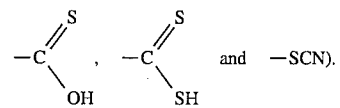

Preferred metal chelate which can be used in the present invention is represented by formula (I-1) or (I-2)

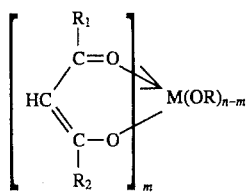

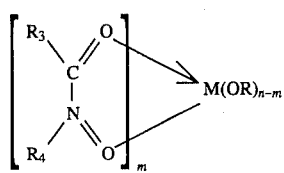

wherein M, R, n, and m are the same as defined above; $R^1$ and $R_2$ each may be the same or different and represents a hydrogen atom, a substituted or unsubstituted alkyl, alkenyl, aromatic ring or cycloalkyl group, or —$OR_5$ group (wherein $R_5$ represents a substituted or unsubstituted alkyl, alkenyl, aromatic ring, or cycloalkyl group); and $R_3$ and $R_4$ each represents a substituted or unsubstituted alkyl, alkenyl, aromatic ring or cycloalkyl group, or —$OR_5$ group.

The compounds which undergoes polycondensation upon hydrolysis is generally contained in the functional layer in an amount of from 20to 100% by weight, preferably from 50 to 100% by weight, interms of its hydrolyzed product, based on the total weight of the solid content in the functional layer.

The layer constitution of the electrophotographic photoreceptor to which the present invention applies will be described hereinafter with reference to a functionally separated type photoreceptor having a laminated structure comprising a charge-generation layer as a surface layer, which exhibits excellent properties such as repetition stability and environmental stability.

As the substrate there may be used an electrically conductive support such as metal, e.g., copper, aluminum, nickel and iron, in the form of cylinder, belt or sheet. Besides the metallic support, there may be used an electrically conducted plastic or paper obtained by vacuum-metallizing or forming a coating having an electrically conductive powder dispersed therein on a plastic or paper.

In order to prevent interference fringe, the surface of the substrate may be roughened by various methods such as etching, anodization, wet blasting, sand blasting, rough cutting and centerless grinding.

The electrically conductive substrate may have an undercoating layer formed thereon for the purpose of inhibiting image defects and improving chargeability and adhesion of a photosensitive layer provided thereon.

Binders to be used in the undercoating layer may be acetal resin (such as polyvinyl butyral), polyvinyl alcohol resin, casein, polyamide resin, cellulose resin, gelatin, polyurethane resin, polyester resin, methacrylic resin, acrylic resin, polyvinyl chloride resin, polyvinyl acetate resin, vinyl chloride-vinyl acetate-maleic anhydride copolymer resin, silicone resin, silicone alkyd resin, phenol-formaldehyde resin and melamine resin. Besides, organic metal compounds containing zirconium, titanium, aluminum, manganese, silicon, etc. can be used. These compounds may be used singly or in the form of mixture or polycondensate thereof. In particular, the organic metal compound containing zirconium or silicon is preferably used since it exhibits excellent film-forming properties, a low residual potential and a small potential change with environmental fluctuations or due to repeated use.

Examples of the silicon compound include vinyltrimethoxysilane, γ-methacryloxypropyl-tris(β-methoxyethoxy)silane, β-(3,4-epoxycyclohexyl)-ethyltrimethoxysilane, γ-glycidoxypropyltrimethoxysilane, vinyltriacetoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, N,N-bis(β-hydroxyethyl)-γ-aminopropyltriethoxysilane, and γ-chloropropyltrimethoxysilane. Particularly preferred examples of these silane compounds include silane coupling agents such as vinyltriethoxysilane, vinyltris(2-methoxyethoxysilane), 3methacryloyloxypropyltrimethoxysilane, 3-glycidoxypropyltrimethoxysilane, 2-(3,4-epoxycyclohexyl)ethyltrimethoxysilane, N-2-(aminoethyl)3aminopropyltrimethoxysilane, N-2-(aminoethyl)3-aminopropylmethyldimethoxysilane, 3-aminopropyltriethoxysilane, N-phenyl-3-aminopropyltrimethoxysilane, 3-mercaptopropyltrimethoxysilane and 3-chloropropyltrimethoxysilane.

Examples of the organic zirconium compound include zirconium butoxide, zirconium ethyl acetoacetate, zirconium triethanolamine, acetyl acetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, zirconium methacrylate butoxide, zirconium stearate butoxide, and zirconium isostearate butoxide.

Examples of the organic titanium compound include tetraisopropyl titanate, tetra-normal butyl titanate, butyl titanate dimer, tetra(2-ethylhexyl)titanate, titanium acetyl acetonate, polytitanium acetyl acetonate, titanium octylene glycolate, titanium lactate ammonium salt, titanium lactate, titanium lactate ethyl ester, titanium triethanol aminate, and polyhydroxy titanium stearate.

Examples of the organic aluminum compound include aluminum isopropylate, monobutoxyaluminum diisopropylate, aluminum tributylate, diethylacetoacetate aluminum diisopropylate, and aluminum tris(ethylacetoacetate).

The foregoing organic metal compound containing silicon, zirconium, titanium or aluminum undergoes polycondensation upon hydrolysis. If such a compound is incorporated in the undercoating layer, the preparation process of the present invention can be employed.

The undercoating layer may comprise various organic or inorganic fine powder incorporated therein for the purpose of inhibiting the generation of interference fringe and improving the electrical properties thereof. Particularly useful are white pigments such as titanium oxide, zinc oxide, chinese white (zinc oxide), zinc sulfide, white lead and lithopone, finely divided powders of inorganic substance such as extender pigment, e.g., alumina, calcium carbonate and barium sulfate, and finely divided powders of synthetic resin such as teflon resin, benzoguanamine resin and styrene resin.

The finely divided powder may be incorporated in the undercoating layer in an amount of 10 to 80% by weight, preferably 30 to 80% by weight based on the weight of the solid content in the undercoating layer.

The grain diameter of the fine powder to be incorporated may be in the range of 0.01 to 2 μm. If the grain diameter exceeds this range, the resulting undercoating layer has a great unevenness and a great electrically partial ununiformity and thus can produce image defects. On the contrary, if the grain diameter falls below this range, a sufficient light scattering effect cannot be exerted.

In the preparation of the undercoating layer-forming coating solution, the foregoing fine powder is dispersed in a solution comprising a resinous component dissolved therein. The dispersion of the fine powder in the resin can be accomplished by various means such as a roll mill, a ball mill, an oscillating mill, an attritor, a sand mill, a colloid mill and a paint shaker.

The thicker the undercoating layer is, the more can be hidden the unevenness on the substrate. Thus, the thicker the undercoating layer is, the less are image defects but the worse is the electrical repetition stability. In general, the thickness of the undercoating layer is preferably in the range of 0.1 to 5 µm.

The photosensitive layer formed on the undercoating layer may have either a single layer structure or a laminated structure in which a charge-generating layer and a charge-transporting layer are functionally separated from each other. In the case of laminated structure, the order of lamination of the charge-generating layer and the charge-transporting layer may be arbitrary. If necessary, a surface protective layer may be provided on the photosensitive layer.

The charge-generating layer can be formed by vacuum evaporation of a charge generation material or applying a dispersion of a charge generation material with a binder resin in an organic solvent.

Examples of the charge generation material employable in the present invention include inorganic photoconductors such as amorphous selenium, crystalline selenium, selenium-tellurium alloy, selenium-arsenic alloy, other selenium compounds and selenium alloys, zinc oxide and titanium oxide; various phthalocyanine pigments such as metal-free phthalocyanine, titanyl phthalocyanine, copper phthalocyanine, tin phthalocyanine and gallium phthalocyanine; various organic pigments such as squarium, anthranthrone, perylene, azo, anthraquinone, pyrene, pyrylium and thiapyrylium; and dyes. These organic pigments have various crystal forms. In particular, phthalocyanine pigments have been known to have various crystal forms such as α-form and β-form. The pigment employable in the present invention may have any crystal form so far as it can provide desired sensitivity.

In order to inhibit agglomeration or improving dispersibility and electrical properties of the charge generation material or like, a silane coupling agent or organic metal alkoxide may be used. In some detail, the charge generation material may be previously surface-treated with such a silane coupling agent or organic metal alkoxide before being subjected to dispersion. Alternatively, such a silane coupling agent or organic metal alkoxide may be added to the coating solution of a charge generation material. The silane coupling agent or organic metal alkoxide is moistened with wet hot air in accordance with the present invention after the application of the charge-generating layer-forming coating solution to accelerate the hydrolytic curing reaction.

Examples of the binder resin to be incorporated in the charge-generating layer include polycarbonate resin such as bisphenol A type and bisphenol Z type, polyester resin, methacrylic resin, acrylic resin, polyvinyl chloride resin, polystyrene resin, polyvinyl acetate resin, styrene-butadiene copolymer resin, vinylidene chloride-acrylonitrile copolymer resin, vinyl chloride-vinyl acetate-maleic anhydride copolymer resin, silicone resin, silicone-alkyd resin, phenol-formaldehyde resin, styrene-alkyd resin, and poly-N-vinylcarbazole.

These binder resins may be used singly or in admixture. The mixing ratio (by weight) of the charge generation material to the binder resin is preferably in the range of 10/1 to 1/10. The thickness of the charge-generating layer is normally in the range of 0.01 to 5 µm, preferably 0.05 to 2.0 µm.

The dispersion of the charge generation material in the binder resin can be accomplished by various means such as a roll mill, a ball mill, an oscillating mill, an attritor, a sand mill and a colloid mill.

Examples of the charge transport material to be incorporated in the charge-transporting layer include positive hole-transport materials such as oxadiazole derivative (e.g., 2,5-bis(p-diethylaminophenyl)-1,3,4-oxadiazole), pyrazoline derivative (e.g., 1,3,5-triphenyl-pyrazoline, 1-[pyridyl-(2)]-3-(p-diethylaminostyryl)-5-(p-diethylaminostyryl)pyrazoline), aromatic tertiary amino compound (e.g., triphenylamine, tri(p-methyl)phenylamine, N,N-bis(3,4-dimethylphenyl)biphenyl-4-amine, dibenzylaniline), aromatic tertiary diamine compound (e.g., N,N'-diphenyl-N,N'-bis(3-methylphenyl)-[1,1'-biphenyl]-4,4'-diamine), 1,2,4-triazine derivative (e.g., 3-(4'-dimethylaminophenyl)-5,6-di-(4'-methoxyphenyl)-1,2,4-triazine), hydrazone derivative (e.g., 4-diethylamizobenzaldehyde-1,1-diphenylhydrazone), quinazoline derivative (e.g., 2-phenyl-4-styrylquinazoline), benzofuran derivative (e.g., 6-hydroxy-2,3-di(p-methoxyphenyl)benzofuran), α-stilbene derivative (e.g., p-(2,2-diphenylvinyl)-N,N-diphenylaniline), enamine derivative, carbazole derivative (e.g., N-ethylcarbazole), poly-N-vinylcarbazole and derivatives thereof; and electron-transport materials such as quinone compound (e.g., chloranil, bromoanil, anthraquinone), tetracyanoquinodimethane compound, fluorenone compound (e.g., 2,4,7-trinitrofluorenone, 2,4,5,7-tetranitro-9-fluorenone), xanthone compound and thiophene compound, and polymer having these compounds in its main or side chain. These charge transport materials may be used singly or in combination.

Examples of the binder resin to be incorporated in the charge-transporting layer include insulating resins such as acrylic resin, polyacrylate, polyester resin, polycarbonate resin (e.g., bisphenol A type, bisphenol Z type), polystyrene, acrylonitrile-styrene copolymer, acrylonitrile-butadiene copolymer, polyvinyl butyral, polyvinyl formal, polysulfone, polyacrylamide, polyamide and chlorinated rubber, and organic photoconductive polymers such as polyvinyl carbazole, polyvinyl anthracene and polyvinyl pyrene.

The charge-transporting layer may be formed by applying a solution of the foregoing charge transport material and binder resin in a proper solvent, and then drying the coated layer. Examples of the solvent to be used for the formation of the charge-transporting layer include aromatic hydrocarbons such as benzene, toluene and chlorobenzene, ketones such as acetone and 2-butanone, halogenated aliphatic hydrocarbons such as methylene chloride, chloroform and ethylene chloride, cyclic or straight-chain ethers such as tetrahydrofuran, dioxane, ethylene glycol and diethyl ether, and mixture thereof. The mixing ratio of the charge transport material to the binder resin is preferably in the range of 10/1 to 1/5. The thickness of the charge-transporting layer is normally in the range of 5 to 50 µm, preferably 10 to 40µm.

For the purpose of inhibiting the deterioration of the photoreceptor by ozone or oxidizing gas generated in the electrophotographic apparatus, or light or heat, the photosensitive layer may contain an additive such as an oxidation inhibitor, a light stabilizer and a heat stabilizer incorporated therein.

Examples of the oxidation inhibitor include hindered phenol, hindered amine, paraphenylene diamine, arylalkane, hydroquinone, spirochroman, spiroindanone, derivatives thereof, organic sulfur compounds, and organic phosphorus compounds.

Examples of the light stabilizer include derivatives such as benzophenone, benzotriazole, dithiocarbamate and tetramethylpiperidine.

For the purpose of improving sensitivity or reducing residual potential or fatigue during repeated use, at least one electron attractive substance may be incorporated in the electrophotographic photoreceptor. Examples of the electron attractive substance which can be incorporated in the electrophotographic photoreceptor to which the present invention can be applied include succinic anhydride, maleic anhydride, dibromomaleic anhydride, phthalic anhydride, tetrabromophthalic anhydride, tetracyanoethylene, tetracyanoquinodimethane, o-dinitrobenzene, m-dinitrobenzene, chloranil, dinitroanthraquinone, trinitrofluorenone, picric acid, o-nitrobenzoic acid, p-nitrobenzoic acid, and phthalic acid. Particularly preferred among these electron attractive substances are fluorenone, quinone, and benzene derivatives having electron attractive substituents such as Cl, CN and $NO_2$.

The application of the coating solution can be accomplished by various coating methods such as a dip coating method, a spray coating method, a bead coating method, a blade coating method and a roller coating method. If moistening according to the present invention is not effected, the coated layer is preferably dried to the touch at room temperature, and then heated to dryness. The heat drying is preferably effected at a temperature of 30° C. to 200° C. over 5 minutes to 2 hours.

The photosensitive layer may have a surface protective layer formed thereon as necessary. As such a surface protective layer there may be used an insulating resin protective layer or a low resistivity protective layer having a resistivity adjustor incorporated in an insulating resin. As such a low resistivity protective layer there may be used a layer having an electrically conductive particulate material dispersed in an insulating resin. The electrically conductive particulate material may be a white, gray or pale particulate material having an electrical resistivity of not more than $10^9 \Omega \cdot cm$ and an average diameter of not more than 0.3 μm, preferably not more than 0.1 μm. Examples of such an electrically conductive material include molybdenum oxide, tungsten oxide, antimony oxide, tin oxide, titanium oxide, indium oxide, solid solution of tin oxide with antimony or antimony oxide, mixture thereof, mixture of particles with these metal oxides, and particles coated with these metal oxides. Particularly preferred among these particulate materials are tin oxide and solid solution of tin oxide with antimony or antimony oxide, which makes it possible to attain a proper adjustment in the electrical resistivity of the surface protective layer and which can provide a substantially transparent protective layer. Examples of the insulating resin include condensed resins such as polyamide, polyurethane, polyester, epoxy resin, polyketone and polycarbonate, and vinyl polymers such as polyvinyl ketone, polystyrene and polyacrylamide.

In order to inhibit the agglomeration of the electrically conductive particulate material or improving dispersibility and electrical properties of the electrically conductive particulate material, a silane coupling agent or organic metal alkoxide may be used. In some detail, the electrically conductive particulate material may be previously surface-treated with such a silane coupling agent or organic metal alkoxide before being subjected to dispersion. Alternatively, such a silane coupling agent or organic metal alkoxide may be added to the coating solution of an electrically conductive particulate material. The silane coupling agent or organic metal alkoxide is moistened as mentioned above in accordance with the present invention after the application of the surface protective layer-forming coating solution to accelerate the hydrolytic curing reaction.

In the foregoing exemplified constitution of photoreceptor, if a silane coupling agent or metal alkoxide compound is incorporated in a plurality of layers, the moistening according to present invention may be effected each time the application of a layer has been completed or may be effected collectively after the application of all the layers has been completed.

The electrophotographic photoreceptor obtained according to the present invention can be mounted in an electrophotographic apparatus such as a light lens copying machine, a laser beam printer using near infrared rays or visible rays, a digital copying machine, a LED printer and a laser facsimile. The electrophotographic photoreceptor according to the present invention can be used with a single-component type or two-component type normal developer or reverse developer. The electrophotographic photoreceptor prepared according to the present invention also causes little current leakage and thus provides excellent properties in a contact electrification system using a charging roller or charging brush.

The present invention will be further described in the following examples, but the present invention should not be construed as being limited thereto.

EXAMPLE 1

To 170 parts by weight of n-butyl alcohol having 4 parts by weight of a polyvinyl butyral resin (S-LEC BM-S, manufactured by Sekisui Chemical Co., Ltd.) dissolved therein were added 30 parts by weight of an organic zirconium compound (acetylacetone zirconium butyrate) and 3 parts by weight of a mixture of organic silane compounds (γ-aminopropyltrimethoxysilane). The mixture was then stirred to obtain an undercoating layer-forming coating solution.

The coating solution thus obtained was coated on an ED (extrusion drawing) aluminum tube substrate (diameter 40 mm) which had been roughened by liquid honing, air-dried at room temperature (24° C.) for 5 minutes, and then dried at a temperature of 50° C. for 10 minutes so that the substrate was kept at a temperature of 50° C. The material was put into a thermo-hygrostat having a temperature of 50° C. and a humidity of 85 % RH (dew point: 47° C.) where it was then subjected to moistening for 20 minutes to accelerate the curing reaction. The material was then put into a hot-air dryer so that it was air-dried at a temperature of 170° C. for 10 minutes.

A mixture of 15 parts by weight of chloro gallium phthalocyanine as a charge generation material, 10 parts by weight of a vinyl chloride-vinyl acetate copolymer resin (VMCH, manufactured by Nihon Unicar Co., Ltd.), 10 parts by weight of a polyvinyl butyral resin (S-LEC BM-S), and 300 parts by weight of n-butyl alcohol was subjected to dispersion by means of a sand mill for 4 hours. The dispersion thus obtained was dip-coated onto the foregoing undercoating layer, and then dried to obtain a 0.2-μm thick charge-generating layer. 4 parts by weight of N,N'-diphenyl-N,N'-bis(3-methylphenyl)-[1,1'-biphenyl]-4,4'-diamine and 6 parts by weight of a bisphenol Z type polycarbonate resin (molecular weight: 40,000) were dissolved in 80 parts by weight of chlorobenzene. The resulting solution was applied to the charge-generating layer, and then dried to form a 20-μm thick charge-transporting layer. Thus, a three-layer electrophotographic photoreceptor was prepared.

The electrophotographic photoreceptor thus obtained was mounted on a laser beam printer XP-11 manufactured by Fuji Xerox Co., Ltd. where it was then charged to −700 V. The electrophotographic photoreceptor thus charged was then exposed to light at a predetermined intensity. The electrophotographic photoreceptor thus exposed was then measured for potential. The electrophotographic photoreceptor was further examined for image quality after 10,000th operation of duplication at a low temperature and humidity (10° C., 15% RH).

COMPARATIVE EXAMPLE 1

A three-layer electrophotographic photoreceptor was prepared in the same manner as in Example 1 except that coating of the undercoating layer-forming coating solution was followed by air-drying at room temperature for 5 minutes and subsequent drying at a temperature of 170° C. for 10 minutes without moistening, followed by formation of a charge-generating layer and a charge-transporting layer in the same manner as in Example 1.

COMPARATIVE EXAMPLE 2

A three-layer electrophotographic photoreceptor was prepared in the same manner as in Example 1 except that coating of the undercoating layer-forming coating solution was followed by air-drying at room temperature for 5 minutes and immediately moistening in a thermo-hygrostat having a temperature of 50° C. and a humidity of 85 % RH for 20 minutes, subsequently followed by drying at a temperature of 170° C. for 10 minutes, further followed by formation of a charge-generating layer and a charge-transporting layer in the same manner as in Example 1.

The results of Example 1 and Comparative Examples 1 and 2 are set forth in Table 1.

TABLE 1

| Example No. | Residual Potential | Change in residual potential after 10,000th operation | Image quality (number of black dots) | Film Properties |
| --- | --- | --- | --- | --- |
| 1 | −53 V | 36 V | 7 | No problem |
| Comp. Ex. 1 | −72 V | 57 V | 62 | No problem |
| Comp. Ex. 2 | −51 V | 34 V | Numerous black dots | Numerous cracks |

It is seen from the results in Table 1 that the photoreceptor of Example 1, which had been moistened after coating of the undercoating layer-forming coating solution, exhibits a large daylight decay and a low residual potential, providing excellent light decay properties. The photoreceptor of Example 1 exhibited a rise in the residual potential at a low temperature and humidity. It also showed little image defects due to repeated use. On the contrary, the photoreceptor of Comparative Example 1 exhibited a rise in the residual potential at a low temperature and humidity, showing a poor environmental stability. It also showed numerous black dots due to repeated use. In the preparation of the photoreceptor of Comparative Example 2, dew was observed on the undercoating layer during moistening, and numerous depressions having a diameter on the order of 10 μm due to dew were observed under microscope. The charge-generating layer formed on the depressed surface showed a nonuniformity in thickness depending on the depressions. There were observed numerous cracks on the undercoating layer. When the image quality of prints obtained from the photoreceptor was examined, numerous black dots were observed on the spots corresponding to cracks at the beginning of duplication.

EXAMPLES 2 to 5 AND COMPARATIVE EXAMPLES 3 to 9

To a solution of 3 parts by weight of a polyvinyl butyral resin (S-LEC BX-1, manufactured by Sekisui Chemical Co., Ltd.) in a mixture of 170 parts by weight of ethyl alcohol and 20 parts by weight of 1-pentanol was added 30 parts by weight of an organic zirconium compound (acetylacetone zirconium butyrate). The mixture was then stirred to obtain an undercoating layer-forming coating solution.

The coating solution thus obtained was coated on an ED aluminum tube substrate (diameter 40 mm) to a dry thickness of 1 μm, and then dried and cured under the conditions set forth in Table 2 to form an undercoating layer. The conditions of the 1st, 2nd and 3rd stages in Table 2 are the atmospheres before, during, and after the moistening, respectively.

A mixture of 15 parts by weight of titanyl phthalocyanine as a charge generation material, 10 parts by weight of a polyvinyl butyral resin (S-LEC BM-S) and 300 parts by weight of n-butyl alcohol was subjected to dispersion by means of a sand mill for 4 hours. The dispersion thus obtained was applied to the foregoing undercoating layer, and then dried to form a 0.2-μm thick charge-generating layer. 4 parts by weight of tri(p-methyl)phenylamine and 6 parts by weight of a bisphenol Z type polycarbonate resin (molecular weight: 40,000) were dissolved in 80 parts by weight of chlorobenzene. The resulting solution was coated on the charge-generating layer, and then dried to form a 20-μm thick charge-transporting layer. Thus, a three-layer electrophotographic photoreceptor was prepared.

The electrophotographic photoreceptor thus obtained was mounted on a laser beam printer XP-11 manufactured by Fuji Xerox Co., Ltd. where it was then charged to −700 V. The electrophotographic photoreceptor thus charged was then exposed to light at a predetermined intensity. The electrophotographic photoreceptor thus exposed was then measured for potential. The electrophotographic photoreceptor was further examined for image quality after 10,000th operation of duplication at a low temperature and humidity (10° C. 15% RH) The results are set forth in Table 2.

TABLE 2

| Example No. | Drying/curing conditions | | | 3rd stage | Residual potential | Change in potential after 10,000th operation | Image quality | |
|---|---|---|---|---|---|---|---|---|
| | 1st stage | 2nd stage | (Dew point) | | | | number of black dots | Depression due to dew |
| 2 | 50° C., 5 min. | 50° C., 85% RH, 20 min. | (47° C.) | 150° C., 15 min. | −32 V | 25 | 9 | None |
| 3 | 60° C., 5 min. | 50° C., 85% RH, 20 min. | (47° C.) | 150° C., 15 min. | −38 V | 35 | 18 | None |
| 4 | 30° C., 5 min. | 30° C., 85% RH, 40 min. | (27.5° C.) | 170° C., 10 min. | −34 V | 31 | 24 | None |
| 5 | 40° C., 5 min. | 30° C., 85% RH, 40 min. | (27.5° C.) | 170° C., 10 min. | −34 V | 33 | 40 | None |
| Comp. Ex. 3 | 20° C., 5 min. | 50° C., 85% RH, 20 min. | (47° C.) | 150° C., 15 min. | −30 V | 23 | 34 | Numerous |
| Comp. Ex. 4 | 100° C., 5 min. | 50° C., 85% RH, 20 min. | (47° C.) | 150° C., 15 min. | −54 V | 48 | 80 | None |
| Comp. Ex. 5 | 150° C., 5 min. | 50° C., 85% RH, 20 min. | (47° C.) | 150° C., 15 min. | −69 V | 56 | 140 | None |
| Comp. Ex. 6 | 20° C., 5 min. | 30° C., 85% RH, 40 min. | (27.5° C.) | 170° C., 10 min. | −38 V | 30 | 66 | Numerous |
| Comp. Ex. 7 | 80° C., 5 min. | 30° C., 85% RH, 40 min. | (27.5° C.) | 170° C., 10 min. | −59 V | 46 | 60 | None |
| Comp. Ex. 8 | 100° C., 5 min. | 30° C., 85% RH, 40 min. | (27.5°C.) | 170° C., 10 min. | −78 V | 61 | 100 | None |
| Comp. Ex. 9 | 20° C., 5 min. | — | — | 170° C., 10 min. | −83 V | 73 | 86 | None |

EXAMPLE 6

A mixture of 23 parts by weight of an alkyd resin (M-6406-50, manufactured by Dainippon Ink & Chemicals, Inc.), 5 parts by weight of a melamine resin (Super Beckamine L-117-60, manufactured by Dainippon Ink & Chemicals, Inc.) and 41 parts by weight of methyl ethyl ketone was applied to an aluminum pipe (diameter 84 mm), and then dried to form a 1.5µm thick undercoating layer.

A mixture of 13 parts by weight of trigonal selenium, 3 parts by weight of a butyral resin (available from XYHLUCL) and 190 parts by weight of cyclohexanone was charged into a ball pot. The mixture was then subjected to ball milling with SUS balls (diameter 10 mm) for 48 hours. To the mixture were then added 1 part by weight of methyl triethoxysilaine as a silane coupling agent and 300 parts by weight of cyclohexanone. The mixture was then subjected to milling for 1 hour. The resulting mill base was withdrawn, and then diluted with cyclohexanone with stirring until the solid content concentration reached 1.8 wt. % to prepare a charge-generating layer-forming coating solution. The coating solution was coated on the foregoing undercoating layer, and then dried for 10 minutes to form a charge-generating layer having a thickness of about 0.2 µm.

The temperature of the substrate on which the undercoating layer and the charge-generating layer had been formed was increased to 55° C. over 5 minutes, moistened at a temperature of 50° C. and a humidity of 70 % RH (dew point: 43° C.), and then dried.

Subsequently, a charge-transporting layer-forming coating solution comprising 90 parts by weight of tri(p-methylphenyl)amine as a charge transport material, 100 parts by weight of a polycarbonate resin (C-1400, manufactured by Teijin Ltd.), 0.002 parts by weight of a silicone oil (KF-54, manufactured by Shin-Etsu Chemical Co., Ltd.) and 870 parts by weight of tetrahydrofuran was prepared, coated on the foregoing charge-generating layer, and then dried to form a 24-µm thick charge-transporting layer. Thus, an electrophotographic photoreceptor was prepared.

The electrophotographic photoreceptor thus obtained was mounted on a copying machine Vivace 500 manufactured by Fuji Xerox Co., Ltd. to determine potential change after exposure and image quality after 10,000th operation of duplication at 30° C. and 80% RH. The results are set forth in Table 3.

COMPARATIVE EXAMPLE 10

A three-layer electrophotographic photoreceptor was prepared in the same manner as in Example 6 except that the formation of the charge-generating layer was followed only by drying at a temperature of 50° C. for 10 minutes (dew point: 8° C.)(i.e., without the moistening). The electrophotographic photoreceptor thus obtained was mounted on a copying machine Vivace 500 manufactured by Fuji Xerox Co., Ltd. to determine potential change after exposure and image quaiity in the same manner as in Example 6. The results are set forth in Table 3.

TABLE 3

| Example No. | Residual potential | Change in residual potential after 10,000th operation | Image quality (number of black dots) |
|---|---|---|---|
| 6 | −23 V | 16 V | 6 |
| Comp. Ex. 10 | −36 V | 23 V | 36 |

In the preparation process of the present invention, a moistening step is provided in the coating step so that the photoreceptor substrate is moistened with wet hot air under specified conditions. Thus, the coat curing reaction can be accelerated to provide an electrophotographic photoreceptor having excellent electrical properties and image quality. Further, the present invention allows a stable preparation of an electrophotographic photoreceptor without being affected by the production environment. Thus, the quality dispersion of the electrophotographic photoreceptor can be reduced, enhancing the reliability of the product.

While the invention has been described in detail and with reference to specific embodiments thereof, it will be apparent to one skilled in the art that various changes and modifications can be made therein without departing from the spirit and scope thereof.

What is claimed is:

1. A process for producing an electrophotographic photoreceptor which, comprises coating on a substrate a functional layer-forming coating solution containing a compound which undergoes polycondensation upon hydrolysis, adjusting a temperature of said substrate having the coated layer such that relationship (1) is satisfied, and then moistening said coated layer at a temperature of 30° C. to 180° C. in an atmosphere of a dew point of 25° C. to 80° C.:

$$DP \leq ST \leq DP+40° C. \qquad (1)$$

wherein DP represents the dew point upon said moistening and ST represents the temperature of the substrate just before said moistening.

2. The process as in claim 1, wherein said compound which undergoes polycondensation upon hydrolysis is a silane coupling agent, a zirconium coupling agent, or an organic metal alkoxide.

3. The process as in claim 1, wherein said electrophotographic photoreceptor comprises said substrate having thereon in sequence an undercoating layer, a charge-generating layer and a charge-transporting layer.

4. The process as in claim 3, wherein said functioned layer-forming coating solution is for the undercoating layer.

5. The process as in claim 3, wherein said functioned layer-forming coating solution is for the charge-generating layer.

6. The process as in claim 1, comprising moistening said coated layer by exposing said coated layer to a wet hot atmosphere.

7. The process of claim 6, wherein the coated layer is exposed to a wet hot atmosphere by blowing a wet hot air over said coated layer.

* * * * *